Sept. 28, 1965  R. L. BROWN  3,208,215
GIMBALED, PARTIALLY SUBMERGED ROCKET NOZZLE
Filed Sept. 4, 1964
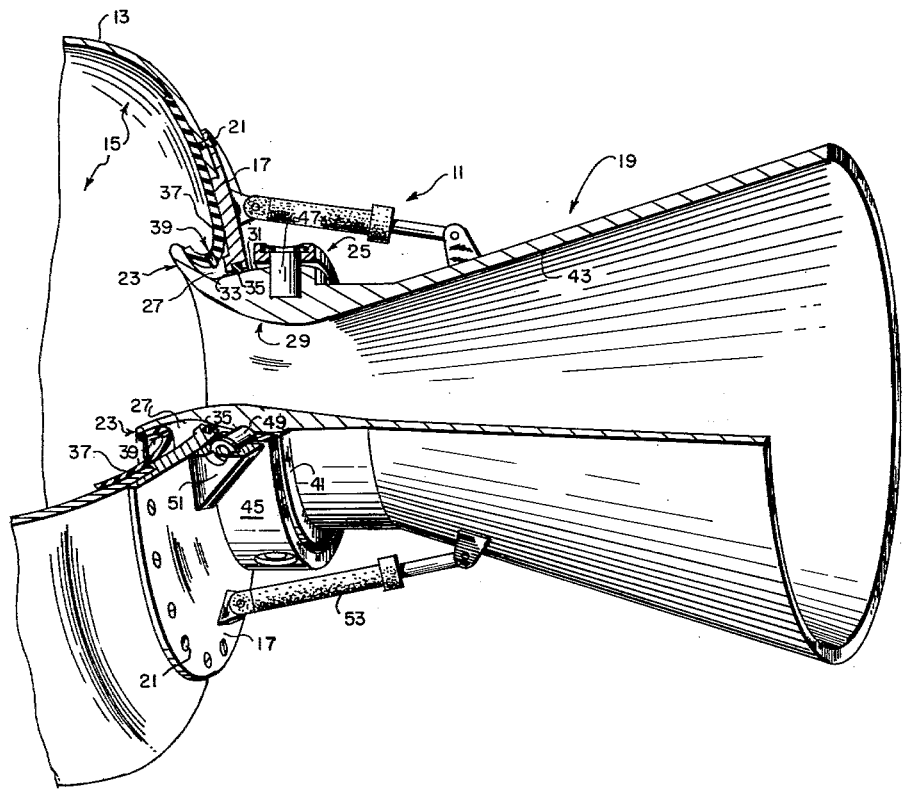
INVENTOR,
RICHARD L. BROWN
BY
ATTORNEYS

United States Patent Office 3,208,215
Patented Sept. 28, 1965

3,208,215
GIMBALED, PARTIALLY SUBMERGED ROCKET NOZZLE
Richard L. Brown, Huntsville, Ala., assignor to the United States of America as represented by the Administrator of the National Aeronautics and Space Administration
Filed Sept. 4, 1964, Ser. No. 394,638
4 Claims. (Cl. 60—35.55)
(Granted under Title 35, U.S. Code (1952), sec. 266)

The invention described herein may be manufactured and used by or for the Government of the United States of America without the payment of any royalties thereon or therefor.

This invention relates to a swiveling rocket nozzle for directional control.

The rocket motor is the prime force producing device for space vehicles. If the engine force is directed other than through the instantaneous center of mass of the vehicle, a side-force is generated which causes an angular acceleration of the vehicle about its center of mass in addition to an axial force which accelerates the vehicle along its path. It is this side force component which can be used to establish the proper alignment or guidance of the vehicle so that its propulsive thrust is applied in the desired direction.

Generally, the liquid propellant rocket engine has obtained a side force component by gimbaling the entire engine. The fuel and oxidizer is delivered to the combustion chamber of the engine from a fuel-oxidizer tankage by way of flexible lines.

The solid propellant rocket engine, however, has an inseparate fuel-oxidized tankage and combustion chamber. Consequently, thrust deflection by the engine is accomplished by motion of the nozzle only or by employing innovations like secondary injection and the like. The gimbaling of nozzles of solid propellant rocket engines has heretofore taken place by the splitting of the nozzle adjacent its throat so as to have a fixed and movable part. The line formed by the contiguous edge surfaces of the split portions is commonly referred to as the split line.

A disadvantage of having a split line formed along the internal surface of the nozzle is that when the movable part is canted, the internal surface is not symmetrical and the forces acting along the surface is uneven. Also, complicated seal arrangements are necessary to prevent leakage of the exhaust through the split line. Recent efforts in this regard include the use of deflectors and low straighteners to deflect or keep the jet exhaust stream away from the split line.

The present invention adopts the gimbaled nozzle concept for solid propellant rocket engines in a manner which eliminates any split along the internal surface of the nozzles. This is accomplished by partially submerging the nozzle entrance within the combustion chamber. The juncture of the nozzle and the casing forming the combustion chamber is therefore removed from the high velocity flow of the exhaust gases which caused the considerable sealing problem along the split line. Also, as the prior use of exhaust flow deflectors and straighteners is eliminated, an overall shorter engine length is achieved. With a shorter engine, the length of a solid propellant chamber may be increased.

Accordingly, it is an object of the present invention to provide a swivel nozzle for solid propellant rocket engines which present a symmetrical internal surface at all times.

Another object is to provide a gimbaled nozzle for a solid propellant rocket engine which is short in length, light in weight, and which has a well protected gas seal.

These and other objects will more readily be understood by the following detailed description when taken together with the accompanying drawings in which:

The single figure is a perspective view of a gimbalel nozzle with portions removed to reveal the internal construction.

Referring now to the drawing, wherein is shown a solid propellant rocket engine arrangement 11. The rear of the casing 13 which defines the combustion chamber 15 for the solid propellant has an opening therein which is covered by an adapter plate 17, which supports a De Laval nozzle 19. The adapter plate 17 is secured to the casing 13 wall be machine screws 21 or the like.

The entrance or convergent portion 23 of the De Laval nozzle 19 partially extends through a center opening within the adapter plate 17 so as to be positioned within the combustion chamber 15. A gimbal 25 attached to the external surface of the adapter plate 17 supports the nozzle 19 so it may swivel with its entrance portion 23 within the combustion chamber 15. The pocket 27 between the nozzle entrance portion 23 and adapter plate 17 allows the nozzle 19 to swivel without its entrance portion 23 binding against the adapter plate 17.

The De Laval nozzle 19 has its region adjacent its throat 29 thickened to form a partial spherical external surface 31. Thus, the spherical external surface 31 provides a substantially continuous contact against the circumferential edge 33 defining the opening within the adapter plate 17.

An annular heat resistant, resilient seal 35 recessed within the circumferential edge 33 of the adapter plate 17 prevents combustion gases escaping between the contiguous surfaces of the adapter plate 17 and nozzle 19. As the seal 35 is located in the stagnant exhaust gas area between the nozzle entrance 23 and adapter plate 17, the prior difficulties of having the seal 35 adjacent the exhaust which is moving at high velocities are eliminated.

A heat resistant, resilient material boot seal 37 is also provided between the converging entarnce portion 23 and the casing 13 to prevent any substantial flow of hot gases toward the gas seal 35. A hole 39 may be provided in the boot seal 37 to equalize pressure between the combustion chamber 15 and the pocket area 27. If the hole is eliminated, the pocket area 27 behind the boot seal 37 can be filled with a suitable lubricant (not shown) to maintain pressure within the pocket area 27 and also to assure the easy movement of the spherical surface 31 of the nozzle 19 within the opening of the adapter 17. The boot 37 is secured by an adhesive to the entrance portion 37 and casing 13.

The nozzle 19 downstream of the throat 29 abruptly forms a shoulder 41 to decrease the thickness of the throat region 27 and extends into the thin cone wall 43 forming the divergent section of the nozzle 19.

The gimbal 25 supports the nozzle for pivoting movement in any direction. As shown, the gimbal 25 is of a conventional construction having a ring 45 supporting the nozzle 19 by a pair of hinge pins 47 which are received within the thickened portion of the nozzle 19 adjacent its throat 29. The ring 45 in turn is supported by a pair of pins 49 of two brackets 51 which are at a ninety degree angle to the nozzle support pins 47. The brackets 51 are secured to the adapter plate 17. While only one bracket 51 can be seen in the figure, the other bracket 51 is similarly located on the opposite side.

The nozzle 19 is actuated to a desired position by a number of hydraulic actuators 53 connected at opposite ends to the diverging portion of the nozzle 19 and the stationary adapter plate 17.

Thus, it is apparent that a novel concept of swiveling a nozzle has been disclosed which eliminates the split line, the use of exhaust deflectors, and the many problems attendant of having gas seals adjacent the exhaust of a solid propellant. The present engine is shorter than those engines using a deflector section to protect the split line seals and also provides a symmetrical internal surface at any angle the nozzle may be swiveled.

Obviously, many modifications and variations of the present invention are possible in the light of the above teachings. It is, therefore, to be understood that within the scope of the appended claims the invention may be practiced other than as specifically described.

What is claimed is:

1. In a casing defining a combustion chamber, said casing having an exit opening; the improvement comprising:
    (a) a pivoted De Laval nozzle having its entrance convergent portion partially extending through said exit opening and into said combustion chamber, the entrance edge thereof being within said combustion chamber and remote from the inner wall of said casing and said opening in all positions of the nozzle;
    (b) said De Laval nozzle having its region adjacent its throat thickened and providing an external spherical surface for continuously contacting the circumferential edge defining the edge opening;
    (c) a gas seal means between the contiguous surfaces of said circumferential edge and said spherical surface for preventing gases from the combustion chamber from escaping; and
    (d) an annular resilient boot seal extending between the entrance convergent portion of said nozzle within said combustion chamber and the inner surface of said casing to prevent any substantial flow of hot gases toward said gas seal means.

2. The combination as defined by claim 1, including:
    (a) a gimbal mechanism attached to the external surface of said casing and to said nozzle;
    (b) hydraulic actuators connected at opposite ends to the divergent portion of said De Laval nozzle and the casing for swiveling said nozzle.

3. A swiveling nozzle arangement for rocket motors, comprising:
    (a) a casing defining a combustion chamber;
    (b) said casing having a dome end with an opening therein;
    (c) a pivoted De Laval nozzle;
    (d) said De Laval nozzle having its entrance convergent portion partially extending through said dome opening so its entrance edge will be remote from the surrounding dome structure and said opening and within said combustion chamber in all positions of said nozzle;
    (e) said De Laval nozzle having its region adjacent its throat thickened and providing an external spherical surface for sliding in a contiguous manner against the circumferential edge defining said dome opening;
    (f) a seal means for preventing gases from escaping between the contiguous surfaces of the circumferential edge of said dome opening and said spherical surface of said De Laval nozzle; and
    (g) means for pivoting said nozzle.

4. A swiveling nozzle arrangement for rocket motors, comprising:
    (a) a casing defining a combustion chamber;
    (b) said casing having a circular opening for the reception of a De Laval nozzle;
    (c) a De Laval nozzle;
    (d) said De Laval nozzle having its entrance covergent portion partially extending through said opening within the casing so its entrance edge it will be remote from the surrounding casing and said opening and be within said combustion chamber in all positions of said nozzle;
    (e) said nozzle having its region adjacent its throat thickened and providing an external spherical surface for sliding in a contiguous manner against the circumferential edge defining said opening;
    (f) seal means for preventing gases within said combustion chamber from escaping between the contiguous surfaces of the circumferential edge of said dome opening and said spherical surface of said nozzle; and
    (g) a gimbal means for supporting said nozzle for swiveling movement.

References Cited by the Examiner

UNITED STATES PATENTS

| | | | |
|---|---|---|---|
| 3,048,010 | 8/62 | Ledwith | 60—35.55 |
| 3,048,977 | 8/62 | Geary | 60—35.55 |
| 3,070,957 | 1/63 | McCorkle | 60—35.55 |

References Cited by the Applicant

UNITED STATES PATENTS

| | | |
|---|---|---|
| 3,032,982 | 5/62 | Gaubatz. |
| 3,039,264 | 6/62 | Ernest. |

OTHER REFERENCES

"Astronautics," March 1962, pp. 28, 29 and 62.

MARK NEWMAN, *Primary Examiner.*